3,074,908
ANTI-OZONANTS AND USE THEREOF IN
RUBBER COMPOSITIONS
Carl Edward Moore, Harry Leroy Larson, and Siegfried Meinstein, Chicago, Ill., assignors to Witco Chemical Company, Inc., New York, N.Y., a corporation of Delaware
No Drawing. Filed Nov. 19, 1958, Ser. No. 774,824
20 Claims. (Cl. 260—45.9)

Our invention relates to new and useful anti-ozonants and to the use thereof in rubber compositions.

It is well recognized in the art that atmospheric ozone causes the deterioration of rubber compositions and rubber goods, notably stretched or stressed rubber goods such as rubber tires, such deterioration manifesting itself notably by cracking of the rubber goods under conditions of stretching or elongation in ordinary usage. In relatively recent years, various anti-ozonants have been developed which, when incorporated into the rubber batches from which the finished rubber goods are made, serve to inhibit the deteriorating action of ozone on said rubber goods. Perhaps the most commonly used and commercially successful anti-ozonants are N,N'-di-alkyl-p-phenylenediamines. Although such compounds serve effectively to inhibit deterioration of rubber goods due to the action of ozone, they possess the serious objection of forming color bodies under the conditions of use, and the resulting coloring or staining effects have materially limited the field of use of such anti-ozonants since they cannot be employed in white or light colored rubber goods. The color bodies which are formed in those instances where anti-ozonants of the type described above are utilized are of such character that, even in minute quantities, they impart a stain, generally brown to deep red, to the rubber stock in which said anti-ozonants are incorporated. Such color bodies possess the further objections of transferring quite easily to objects which come into contact with such rubber stock, and the like staining or coloring materials also tend to volatilize on storage and thereby cause discoloration of various objects with which such vapors come into contact as, for instance, light enamels, painted walls, white side wall tires, etc. The inability adequately to protect white and light colored rubber stock against the deteriorating effects of ozone represents a major unsolved problem in rubber technology.

Various other anti-ozonants have been proposed, as shown, for instance, in U.S. Patents Nos. 2,766,219 and 2,802,810 but, for a variety of reasons with which the art is familiar, those which are in most widespread commercial use have numbers of objections among which are the aforementioned staining or coloring characteristics.

We have made the surprising discovery that compounds such as N,N'-dialkyl-m-phenylenediamines or other N,N'-dialkyl phenylenediamines, if hydrogenated to effect hydrogenation of the benzene nucleus, not only possess excellent anti-ozonant properties under dynamic or flexing conditions but, in addition, they do not, in use in rubber goods, form color bodies. The result is that the anti-ozonants of our present invention have a greatly enhanced utility in that they can effectively be used in white rubber goods, such as white-wall tires, as well as in dark or colored rubber goods.

The extent of the hydrogenation of the benzene nucleus plays a major role in the extent to which staining is decreased or avoided in the anti-ozonant compound. In the especially preferred embodiments of the invention, the benzene nucleus of the defined compounds is completely hydrogenated. However, good results, which constitute substantial improvement over what is obtained with prior art anti-ozonants of the type described above, are also obtained in the case where the extent of hydrogenation of the benzene nucleus is even of the order of 40% or more and, better still, at least 75% of complete hydrogenation. The extent of hydrogenation of the benzene nucleus of the N,N'-dialkyl phenylenediamines can readily be determined by spectrochemical means because the benzene ring shows characteristic absorption bands in both the infra red and particularly the U.V. regions of the spectrum. These bands disappear on hydrogenation and, therefore, a convenient means is afforded of following the course of the reaction pursuant to which hydrogenation of the benzene nucleus is effected. While, as indicated above, we find it especially advantageous to utilize those compounds in which the benzene nucleus is fully hydrogenated where, in effect, the anti-ozonants obtained comprise N,N'-dialkyl cyclohexyldiamines, the broader scope of our invention encompasses compounds or compositions or mixtures which result from, or correspond to products obtained by, hydrogenating N,N'-dialkyl phenylenediamines such as N,N'-dialkyl-m-phenylenediamines to the extent of at least 40%, and better still of at least 75% of full hydrogenation of the benzene nucleus.

The anti-ozonants of our present invention can be prepared in any one of a variety of ways. One suitable procedure is to react a nitroaniline or dinitrobenzene or phenylenediamine, advantageously the meta compounds, for instance, m-phenylenediamine, under a hydrogen pressure of 2500 p.s.i. at 400 degrees F. in the presence of Raney nickel catalyst or, more advantageously, rhodium metal deposited on carbon at much lower pressures and temperature. A preferred procedure is illustrated in the following example.

*Example*

1 mol of m-phenylenediamine, 6 mols of methyl-isoamyl ketone, and from 5 to 10% by weight of 5% rhodium metal deposited on carbon as a catalyst (said amount of catalyst being based on the yield of product obtained) are hydrogenated at a pressure in excess of 10 p.s.i.g., more advantageously at 300 to 500 p.s.i.g., and at a temperature of 100 to 280 degrees F. Under such latter pressure and temperature conditions, the reaction is usually completed in about 2 hours. The reaction mixture is subjected to rapid agitation, the higher agitation speeds favoring the reaction and enabling the use of lower pressures and temperatures. The excess methyl-isoamyl ketone, or much of it, is recovered unchanged and can be re-used in subsequent reactions. After the completion of the reaction, the slurry of catalyst and ketone-product is filtered to separate and recover the catalyst for re-use, and the filtrate is distilled under reduced pressure to remove and recover the excess methyl-isoamyl ketone and then any secondary alcohol which may have been formed in the reaction. The residue, comprising N,N'-di-2-isoheptyl-m-cyclohexyldiamine, is a honey-colored liquid when high grade reactants are used and tends to be of dark brown color when poorer quality reactants are employed. If desired, the product can be distilled under reduced pressure to remove substantially all of the color bodies therefrom.

It is especially advantageous that the compounds utilized as anti-ozonants in accordance with the present invention be those nuclearly hydrogenated N,N'-dialkyl phenylenediamines in which the amino groups are in the meta position to each other and wherein the total number of carbon atoms in the dialkyl radicals is from 14 to 20. The anti-ozonants of the invention may, in part, be represented by the formula

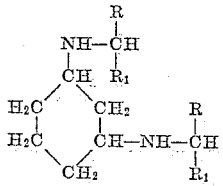

where R and $R_1$ are alkyl radicals and the total number of carbon atoms in each of said alkyl radicals is from 1 to 10. Particularly preferred are those compounds in which R contains from 1 to 3 carbon atoms and $R_1$ contains from 5 to 7 carbon atoms.

The reaction mixtures, when procedures of the type described in the foregoing example are used, appear, upon analysis, to contain mixtures of compounds of the following formulas:

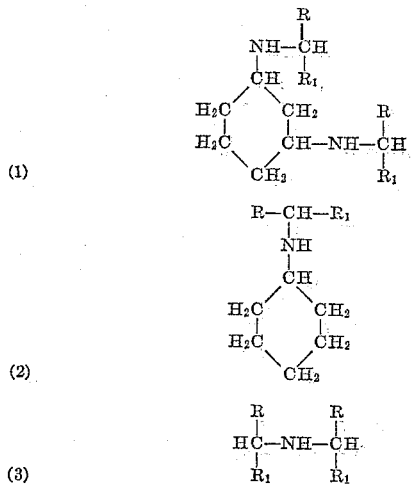

The compounds (1), which are the effective anti-ozonants of the present invention, can be stripped or removed from the compounds of the (2) and (3) types during the distillation of the excess ketone and secondary alcohol from the reaction mixtures. Under carefully controlled fractional distillation procedures for the removal of the excess ketone and secondary alcohol, compounds of the (1) type may be retained in the product in admixture with compounds of the (2) and (3) types and the mixture used for the purposes of the present invention.

Illustrative examples of our novel anti-ozonants are the following:

N,N'-di-2-octyl-m-cyclohexyldiamine
N,N'-di-2-heptyl-m-cyclohexyldiamine
N,N'-di-2-cyclohexyl-p-cyclohexyldiamine
N,N'-di-2-decyl-m-cyclohexyldiamine
N,N'-di-3-octyl-m-cyclohexyldiamine
N,N'-di-3-octyl-o-cyclohexyldiamine
N,N'-di-3-cyclohexyl-m-cyclohexyldiamine
N,N'-di-2-amyl-m-cyclohexyldiamine
N,N'-di-2-octyl-p-cyclohexyldiamine
N,N'-di-2-isoheptyl-m-cyclohexyldiamine Our anti-ozonants can be used as such or in the form of salts thereof with organic or inorganic acids. These salts of the anti-ozonants may be formed and then added to the rubber batch or they may be formed in situ in the rubber batch upon the inclusion therein, in such instances in which this is done, of such acidic compounds as phthalic anhydride. Typical of such salts are the phthalates, benzoates, hydroxybenzoates, maleates, fumarates, sulfates, chlorides and nitrates.

The rubbers into which our novel anti-ozonants are incorporated fall into the class of natural rubbers and sulfur-vulcanizable and sulfur-vulcanized unsaturated synthetic rubbers. Such rubbers, and rubber compositions, are well known in the art and include among others, by way of illustration, those disclosed in the aforementioned U.S. Patents Nos. 2,766,219 and 2,802,810.

The anti-ozonants of our invention are utilized in small proportions, generally in the range of about 0.1% to about 5%, by weight of the rubber, with a good average being from about 0.3% to about 3%.

Various of our anti-ozonants appear to possess certain additional properties and characteristics, namely, in increasing the tear strength of various rubber compositions and in functioning to some extent as rubber vulcanization accelerators so that, in the latter case, it is possible to reduce the amount of conventional accelerators which might be utilized in given rubber formulations. They also, in general, tend to possess some anti-oxidant properties which, of course, enhances further their utility.

As we have stated above, the anti-ozonants of our invention function best when employed under conditions where the rubber products in which they are incorporated are utilized under flexing or dynamic conditions as, for instance, in the case of rubber tires for automobile and other vehicular usage. In those instances where it is proposed to use said anti-ozonants in rubber compositions which undergo both dynamic and static conditions of stress, it is particularly desirable also to incorporate into the rubber batch special waxes or materials functionally equivalent to waxes which operate best under static stress conditions. These types of waxes are well known in the rubber industry and include petroleum microcrystalline waxes and blends thereof with other waxes usually also derived from petroleum sources, and they are commonly used in rubber formulations for automobile tires and other rubber goods.

What we claim as new desire to protect by Letters Patent of the United States is:

1. A rubber composition selected from the class consisting of natural and sulfur-vulcanizable and sulfur-vulcanized unsaturated synthetic rubbers, containing, as an anti-ozonant, a member selected from the group consisting of N,N'-dialkyl phenylenediamine hydrogenated in the benzene nucleus to an average extent equal to at least 40% of full hydrogenation of said benzene nucleus, and salts thereof.

2. A rubber composition selected from the class consisting of natural and sulfur-vulcanizable and sulfur-vulcanized unsaturated synthetic rubbers, containing, as an anti-ozonant, a member selected from the group consisting of N,N'-dialkyl-m-phenylenediamine hydrogenated in the benzene nucleus to an average extent equal to at least 40% of full hydrogenation of said benzene nucleus, and salts thereof.

3. A rubber composition selected from the class consisting of natural and sulfur-vulcanizable and sulfur-vulcanized unsaturated synthetic rubbers, containing, as an anti-ozonant, a member selected from the group consisting of N,N'-dialkyl-m-phenylenediamine hydrogenated in the benzene nucleus to an average extent equal to at least 40% of full hydrogenaation of said benzene nucleus, and salts thereof, the total number of carbon atoms in said dialkyl radicals being from 14 to 20.

4. White to light-colored rubber compositions selected from the class consisting of natural and sulfur-vulcanizable and sulfur-vulcanized unsaturated synthetic rubbers, containing, as an anti-ozonant, a member selected from the group consisting of N,N'-dialkyl-m-phenylenediamine hydrogenated in the benzene nucleus to an average extent equal to at least 40% of full hydrogenation of said benzene nucleus, and salts thereof, the total number of carbon atoms in said dialkyl radicals being from 14 to 20.

5. A rubber composition selected from the class consisting of natural and sulfur-vulcanizable and sulfur-vulcanized unsaturated synthetic rubbers, containing, as an anti-ozonant, a member selected from the group consisting of a chemical compound corresponding to the formula

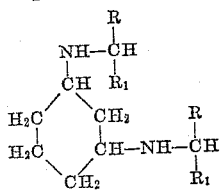

where R and R₁ are alkyl radicals and the total number of carbon atoms in each of said alkyl radicals being from 1 to 10, and salts of said chemical compound.

6. A rubber composition selected from the class consisting of natural and sulfur-vulcanizable and sulfur-vulcanized unsaturated synthetic rubbers, containing, as an anti-ozonant, a member selected from the group consisting of a chemical compound corresponding to the formula

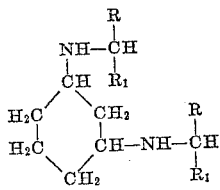

where R is an alkyl radical containing from 1 to 3 carbon atoms, and R₁ is an alkyl radical containing from 5 to 7 carbon atoms, and salts of said chemical compound.

7. A rubber composition selected from the class consisting of natural and sulfur-vulcanizable and sulfur-vulcanized unsaturated synthetic rubbers, containing, as an anti-ozonant, a member selected from the group consisting of a chemical compound corresponding to the formula

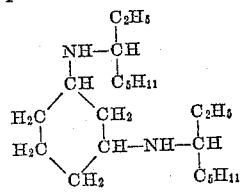

and salts of said chemical compound.

8. White to light-colored rubber compositions selected from the class consisting of natural and sulfur-vulcanizable and sulfur-vulcanized unsaturated synthetic rubbers, containing, as an anti-ozonant, a chemical compound corresponding to the formula

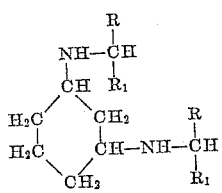

where R and R₁ are alkyl radicals and the total number of carbon atoms in each of said alkyl radicals being from 1 to 10, and salts of said chemical compound.

9. White to light-colored rubber compositions selected from the class consisting of natural and sulfur-vulcanizable and sulfur-vulcanized unsaturated synthetic rubbers, containing, as an anti-ozonant, a member selected from the group consisting of N,N'-di-2-isoheptyl-m-cyclohexyldiamine and its salts.

10. The method of inhibiting ozone attack on rubber goods selected from the class consisting of natural and sulfur-vulcanizable and sulfur-vulcanized unsaturated synthetic rubbers, which comprises incorporating into the rubber batch from which such rubber goods are prepared an anti-ozonant in the form of an N,N'-dialkyl phenylenediamine hydrogenated in the benzene nucleus to an average extent equal to at least 40% of full hydrogenation of said benzene nucleus, and salts thereof.

11. The method of inhibiting ozone attack on rubber goods selected from the class consisting of natural and sulfur-vulcanizable and sulfur-vulcanized unsaturated synthetic rubbers, which comprises incorporating into the rubber batch from which such rubber goods are prepared an anti-ozonant in the form of an N,N'-dialkyl-m-phenylenediamine hydrogenated in the benzene nucleus to an average extent equal to at least 40% of full hydrogenation of said benzene nucleus, and salts thereof, the total number of carbon atoms in said dialkyl radicals being from 14 to 20.

12. The method of inhibiting ozone attack on rubber goods selected from the class consisting of natural and sulfur-vulcanizable and sulfur-vulcanized unsaturated synthetic rubbers, which comprises incorporating into the rubber batch from which such rubber goods are prepared a chemical compound corresponding to the formula

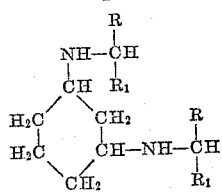

where R and R₁ are alkyl radicals and the total number of carbon atoms in each of said alkyl radicals being from 1 to 10, and salts of said chemical compound.

13. The method of inhibiting ozone attack on white to light-colored rubber goods selected from the class consisting of natural and sulfur-vulcanizable and sulfur-vulcanized unsaturated synthetic rubbers, which comprises incorporating into the rubber batch from which such rubber goods are prepared a chemical corresponding to the formula

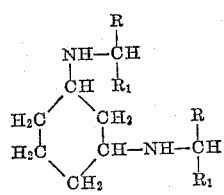

where R and R₁ are alkyl radicals and the total number of carbon atoms in each of said alkyl radicals being from 1 to 10, and salts of said chemical compound.

14. New and useful anti-ozonant compounds, effective in inhibiting ozone attack on rubber goods, said compounds corresponding to the formula

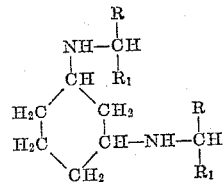

where R and R₁ are alkyl radicals and the total number of carbon atoms in each of said alkyl radicals being from 1 to 10, and salts of said chemical compound.

15. As new and useful anti-ozonants, effective in inhibiting ozone attack on rubber goods, N,N'-dialkyl-m-phenylenediamines hydrogenated in the benzene nucleus to an average extent equal to at least 40% of full hydrogenation of said benzene nucleus, and salts thereof, the total number of carbon atoms in said dialkyl radicals being from 14 to 20.

16. N,N'-dialkyl cyclohexyldiamines, in which said alkyl radicals contain a total of from 14 to 20 carbon atoms, and salts thereof.

17. N,N'-dialkyl-m-cyclohexyldiamines, in which said alkyl radicals contain a total of from 14 to 20 carbon atoms, and salts thereof.

18. N,N'-di-2-octyl-m-cyclohexyldiamine, and salts thereof.

19. N,N'-di-2-isoheptyl-m-cyclohexyldiamine, and salts thereof.

20. As new and useful anti-ozonants, effective in inhibiting ozone attack on rubber goods, compounds corresponding to the formula

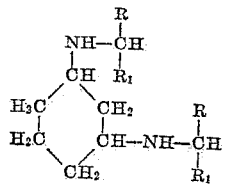

wherein R is a cyclohexyl radical, and $R_1$ is a radical selected from the group consisting of alkyl and cyclohexyl radicals, and in which the total number of carbon atoms in R and $R_1$ is from 14 to 24 carbon atoms, and salts of said compounds.

References Cited in the file of this patent

UNITED STATES PATENTS

| | | |
|---|---|---|
| 2,323,948 | Von Bramer et al. | July 13, 1943 |
| 2,511,028 | Whitman | June 13, 1950 |
| 2,606,926 | Kirby | Aug. 12, 1952 |
| 2,636,051 | Whetstone et al. | Apr. 21, 1953 |
| 2,851,438 | Tucker | Sept. 9, 1958 |
| 2,867,604 | Rosenwald et al. | Jan. 6, 1959 |

FOREIGN PATENTS

| | | |
|---|---|---|
| 728,509 | Great Britain | Apr. 20, 1955 |
| 1,140,433 | France | Mar. 4, 1957 |